Aug. 19, 1952    D. L. WAUGH    2,607,713
METHOD OF MAKING V BELTS
Filed Feb. 25, 1950

INVENTOR.
DALE L. WAUGH
BY
HIS ATTORNEY

Patented Aug. 19, 1952

2,607,713

UNITED STATES PATENT OFFICE 2,607,713

METHOD OF MAKING V BELTS

Dale L. Waugh, Dayton, Ohio, assignor to The Dayton Rubber Company, a corporation of Ohio Application February 25, 1950, Serial No. 146,190

2 Claims. (Cl. 154—4)

The present invention relates to belts and their method of manufacture. More particularly it relates to an improved type of wrapped-molded belt and a novel method for its manufacture. Endless wrapped-molded belts of the V-type are generally made by building a cylindrical belt body on a drum from a plurality of superimposed layers to give the desired internal construction of the belt. The resulting belt body is then cut into individual endless cores by means of inclined knives or cut square and skived so that the resulting endless cores having a trapezoidal cross section or that of a truncated vertical cone section are wrapped with rubberized fabric and placed in a mold, after which the mold is rag wrapped to place the assembled body structure under compression, after which it is vulcanized. Typical methods for building belts by this procedure are described in the patent to Freedlander No. 2,336,084, dated December 7, 1943, and to Kremer et al. No. 2,356,249, dated August 22, 1944.

While the foregoing methods have been very satisfactory and have been widely used to produce large quantities of belts, it has been found that certain improvements may be effected in obtaining uniformity of internal structure and savings in material, with resultant improvement in performance and lower cost.

Certain disadvantages have been found to exist in the practice of the methods referred to above. During cutting, using knife blades disposed at an angle, it has been found that slight distortion of the blades may occur on engagement with internally positioned cord or fabric with resultant inequality in the internal cross section or deformation thereof and accompanying variations in volume and dimensions among cores cut from the same belt sleeve. It has further been found that the cutting of the belts at an angle to the axis of the drum tends to produce some stressing and distortion of the assembled layers with the result that the final belt would be non-uniform in cross section and will tend to become unbalanced in use. Furthermore, cutting of the belts at an angle produces a certain amount of waste material in the form of selvage or ring scrap between the cut sections.

It is therefore an object of the present invention to provide a novel type of belt core from which a wrapped-molded belt of uniform internal structure may be obtained. It is a further object of the present invention to describe a method for the manufacture of belt cores and wrapped-molded belts having a uniform internal construction and which will at the same time effect savings of material and economy of manufacture. Other objects will be apparent from the description below.

In accordance with the present invention, the belt body is built up on a drum or mandrel in an inverted position by comparison with the conventional methods as described above. By this method the compression section is applied last, and after the body is cut into individual endless cores these are inverted and wrapped and molded in the conventional manner. The compression section is extruded in the form of a plurality of trapezoidal belt segments joined together by relatively narrow strips and cutting is performed vertically to the drum at the point where these segments are joined. The resultant cores are then wrapped and molded in the conventional manner.

The invention is described in greater detail with reference to the accompanying drawings in which.

Figure 1:
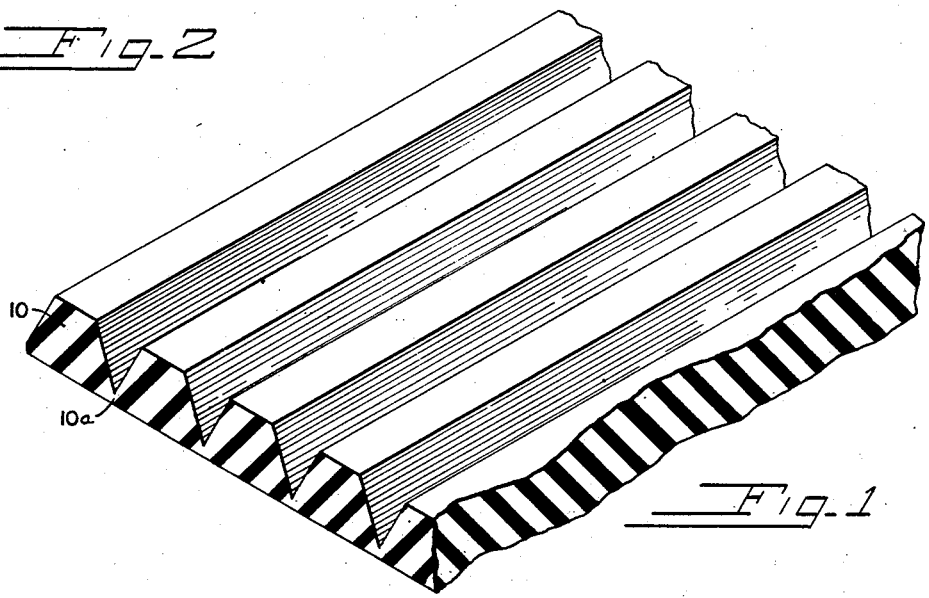
Figure 1 is an elevational view, partly in cross section showing the structure of the extruded trapezoidal compression section.

As illustrated in the aforesaid drawings, a mandrel or belt building drum 11 is selected having a circumference corresponding to the desired outer circumference of the belt. The belt body is then built up in the following manner:

As shown in Figure 1, the compression layer 10 has been preformed in the form of a strip by extrusion or otherwise and has the shape of a plurality of parallel trapezoidal segments joined together at their widest parallel portions, or bases, by a relatively narrow section of material as shown at 10a. Each of these trapezoidal segments is to form a compression section of a corresponding belt and has a cross section corresponding substantially to an isosceles trapezoid. Preferably, the segments are extruded in the form of two or more adjacent segments and these are arranged on a building drum in side to side relationship. For example, if a drum 24 in. in length is utilized the compression section may be extruded in the form of a single 24 in. wide strip but ordinarily it is more desirable to extrude narrower widths in which case three 8 in. strips or two 12 in. strips could be preformed and laid side by side on the drum. If desired, however, the compression section may be extruded in the form of a single segment and these may be individually applied over the face of the drum in an abutting manner. The depth of section 10a which joins the segments together should preferably be at a minimum, sufficient only to facilitate handling the segments as groups.

Figure 2:
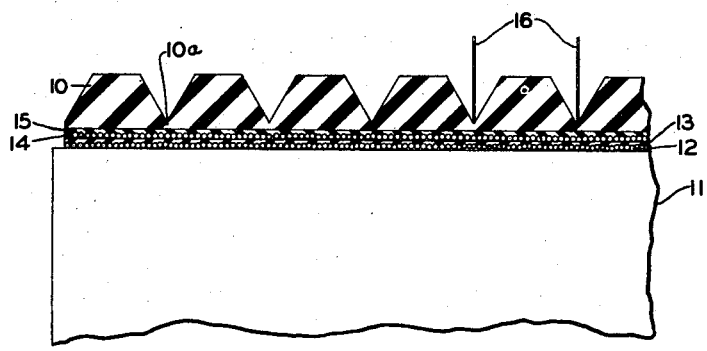
Figure 2 is a transverse cross sectional view illustrating the assembled belt body on a drum.

As shown in Figure 2, a layer 12 which may, for example, be a layer of frictioned bias fabric with a skim coating 13 of gum rubber on the top surface, is wound around the drum. One or more layers of this material may be applied if desired. Instead of fabric, gum stock or other rubber compound may be applied. A single ply of neutral axis cord 14 is then spun on top of layer 13. Over this cord a layer of thin gum cushion stock 15 is next applied. Compression layer 10 is then laid over layer 15 and spliced in any conventional manner. A cement coating may be applied to the top surface of layer 15 before the application of the compression section in order to insure adhesion.

Figure 3:
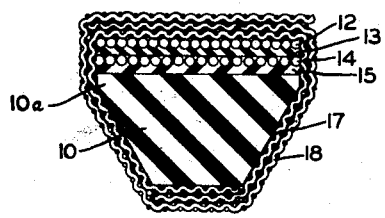
Figure 3 is a cross section of an individual belt body with its outer fabric wrapping prior to molding.

After assembly of the respective layers on the drum, individual endless belt segments or cores are formed by rotating the drum while in contact with one or more pairs of spaced vertically positioned knives 16 which cut straight through the assembled layers. The individual segments are then stripped from the drum and turned inside out. A wrapping of two layers 17 and 18 of bias fabric is then applied around the core lapped at the top and bottom of the belt in the manner shown, for example, in Figure 3. The resulting core has a cross section departing slightly from the trapezoidal due to the vertical portion 10a. In Figure 3, this departure is somewhat exaggerated for purposes of illustration.

Figure 4:
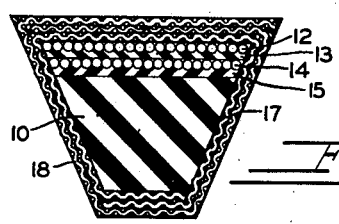
Figure 4 illustrates in cross section the structure of a finished belt after molding.

After the wrapper has been applied the assembled structure is placed in a ring mold in the manner described in the aforementioned Patent No. 2,336,084 for example, and is rag wrapped forcing the uncured assembly into conformation with the shape of the mold. The assembly is then cured and the resulting belt will have the construction illustrated in Figure 4. Since the mold has the conformation of a true trapezoid, the slight departure from the form caused by the point of juncture of the extruded segments at 10a, is eliminated during the molding operation.

By way of example, a building drum having a circumference of 70 in. was utilized in building a number of wrapped molded belts. A layer of 0.031 gauge crude rubber gum stock was wound on the drum and spliced. A single ply of 2200 denier 5 ply rayon cord was then spun over the top of the gum layer. On top of the cord layer was next applied a layer of 0.031 gauge crude rubber gum stock. On top of the last named layer of gum stock was applied an extruded compression layer having the shape illustrated in Figure 1 composed of 0.250 gauge crude rubber compounded stock containing about 5% of finely divided cellulose fibers milled therein. This layer was spliced in the conventional manner and the resulting belt sleeve was then cut into core sections 0.350 in. thick and 0.500 in. wide. In order to compare the results obtained by this method with conventional practice, each core segment was weighed and the results checked with the weights of core sections produced by the methods described in the Freedlander and Kremer et al. patents referred to above. By the present method, the variation in weight was within plus or minus 1%, whereas by the previous method the variation of individual cores was more than plus or minus 5%. Each segment was then inverted. Each endless core segment was then wrapped with 8 oz. 2 ply warp and fill cotton duck, bias cut, frictioned on two sides and skim coated with natural rubber on top. The assembled belts were then placed in ring molds and forced into conformation with the mold shape by tightly wrapping the ring mold with rag cross wrap in the usual manner. The resulting belts were found to have a uniform cross section, with the cords in uniform alignment and the volume and structure of the compression section substantially the same in all the belts made with this construction.

The rubber stocks used are compounded with vulcanizing agents, accelerators, fillers, pigments, and the like, in the manner known to the art. The term "rubber" as used herein is intended to include both natural rubber, and the synthetic vulcanizable rubber-like materials or elastomers, such as conjugated diolefine polymers and copolymers including butadiene-styrene copolymer (Buna-S or GR–S), butadiene-acrylic nitrile copolymer (Buna-N or GR–A), polychloroprene (neoprene), and the like.

I claim:

1. The method for the manufacture of V-type laminated belts having tension, neutral axis and compression sections which comprises preforming rubber material into a strip comprising a plurality of adjacent, parallel segments adapted to constitute the compression sections of the belts, each segment having a cross section corresponding substantially to an isosceles trapezoid with the base thereof formed by a wider parallel side and the top thereof formed by a narrow parallel side, said segments being joined together at the base thereof; applying tension and neutral axis layers comprising rubber material to a cylindrical mandrel, superimposing said preformed strip on said layers with the bases of the segments adjacent said neutral axis layer, and cutting through the resulting assembled structure at the juncture of each segment with the adjacent segment and thereby forming a plurality of endless laminated belt core members.

2. The method for the manufacture of V-type belts having tension, neutral axis and compression sections, which comprises extruding a strip of rubber material comprising a plurality of adjacent parallel segments adapted to constitute the compression sections of the belts, each having a cross section corresponding substantially to an isosceles trapezoid with the base thereof formed by a wider parallel side and the top thereof formed by a narrow parallel side, said segments being joined together at the base thereof; applying a rubber-containing tension section to a mandrel; applying a rubber-containing neutral axis section over said tension section; applying said extruded strip over said neutral axis section with the bases of said segments adjacent thereto and superimposed thereon; cutting through the resulting structure vertically of the mandrel through the juncture of each segment with the adjacent segment and thereby forming a plurality of endless belt core members having a tension section at the bottom, an intermediate neutral axis section, and a compression section at the top; removing said belt core members from the mandrel; inverting said members to place the narrow side of each compression section segment on the inside of said belt core member; wrapping said belt core member with fabric and molding and vulcanizing said wrapped belt core members to form a plurality of wrapped-molded V-type belts.

DALE L. WAUGH.

REFERENCES CITED

The following references are of record in the file of this patent:

UNITED STATES PATENTS

| Number | Name | Date |
|---|---|---|
| 1,906,397 | Meyer | May 2, 1933 |
| 1,969,067 | Freeman | Aug. 7, 1934 |